(12) United States Patent
Lammers et al.

(10) Patent No.: US 8,686,879 B2
(45) Date of Patent: Apr. 1, 2014

(54) GRAPHICAL DISPLAY FOR MUNITION RELEASE ENVELOPE

(75) Inventors: Richard H. Lammers, Madison, CT (US); Greg Boria, Woodbury, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 361 days.

(21) Appl. No.: 13/119,790

(22) PCT Filed: Sep. 25, 2008

(86) PCT No.: PCT/US2008/077613
§ 371 (c)(1),
(2), (4) Date: Mar. 18, 2011

(87) PCT Pub. No.: WO2010/036254
PCT Pub. Date: Apr. 1, 2010

(65) Prior Publication Data
US 2011/0169666 A1 Jul. 14, 2011

(51) Int. Cl.
*G01C 21/00* (2006.01)
(52) U.S. Cl.
USPC ........... 340/977; 340/971; 340/973; 340/979; 701/3; 701/7; 701/11; 701/13; 701/14
(58) Field of Classification Search
CPC ...................................... G01C 23/00
USPC ............ 340/977, 971, 973, 979; 701/3, 7, 11, 701/13, 14
See application file for complete search history.

(56) References Cited

U.S. PATENT DOCUMENTS

| | | |
|---|---|---|
| 3,558,865 A | 1/1971 | Berndt et al. |
| 3,736,411 A | 5/1973 | Berndt |
| 3,793,481 A | 2/1974 | Ripley et al. |
| 3,880,043 A | 4/1975 | Cox et al. |
| 3,883,091 A | 5/1975 | Schaefer |
| 4,478,581 A | 10/1984 | Goda |
| 4,679,751 A | 7/1987 | Peterson |
| 4,715,417 A | 12/1987 | Coloney |
| 5,136,951 A | 8/1992 | Herrlinger |
| 5,200,606 A | 4/1993 | Krasutsky et al. |
| 5,224,109 A | 6/1993 | Krasutsky et al. |
| 5,285,461 A | 2/1994 | Krasutsky et al. |
| 5,331,881 A * | 7/1994 | Fowler et al. ............... 89/41.21 |
| 5,351,597 A | 10/1994 | Holmstrom et al. |
| 5,369,589 A | 11/1994 | Steiner |
| 5,379,966 A | 1/1995 | Simeone et al. |
| 5,435,503 A | 7/1995 | Johnson, Jr. et al. |
| 5,465,212 A | 11/1995 | Fowler et al. |
| 5,586,219 A | 12/1996 | Yufik |
| 5,601,255 A | 2/1997 | Romer et al. |

(Continued)

FOREIGN PATENT DOCUMENTS

EP 0282394 1/1988

OTHER PUBLICATIONS

Search Report and Written Opinion mailed on Nov. 6, 2009 for PCT/US 2008/077613.

(Continued)

*Primary Examiner* — Tai T Nguyen
(74) *Attorney, Agent, or Firm* — Carlson, Gaskey & Olds P.C.

(57) ABSTRACT

A method and module for displaying a munition release envelope.

18 Claims, 5 Drawing Sheets

(56) References Cited

U.S. PATENT DOCUMENTS

| | | |
|---|---|---|
| 5,838,262 A | 11/1998 | Kershner et al. |
| 5,855,339 A | 1/1999 | Mead et al. |
| 5,893,085 A | 4/1999 | Phillips et al. |
| 5,898,483 A | 4/1999 | Flowers |
| 6,024,326 A | 2/2000 | Godfrey et al. |
| 6,056,237 A | 5/2000 | Woodland |
| 6,061,068 A | 5/2000 | Hoffman, II et al. |
| 6,176,167 B1 | 1/2001 | Sanderson |
| 6,196,496 B1 | 3/2001 | Moskovitz et al. |
| 6,250,197 B1 | 6/2001 | Sanderson |
| 6,254,394 B1 | 7/2001 | Draper et al. |
| 6,286,410 B1 | 9/2001 | Leibolt |
| 6,349,898 B1 | 2/2002 | Leonard et al. |
| 6,453,790 B1 | 9/2002 | Cesulka et al. |
| 6,460,445 B1 | 10/2002 | Young et al. |
| 6,571,155 B2 | 5/2003 | Carriker et al. |
| 6,672,534 B2 | 1/2004 | Harding et al. |
| 6,687,186 B1 | 2/2004 | Fields |
| 6,718,862 B1 | 4/2004 | Sanderson |
| 6,779,430 B1 | 8/2004 | Sanderson |
| 6,789,455 B1 | 9/2004 | Sanderson |
| 6,802,238 B1 | 10/2004 | Sanderson |
| 6,802,239 B1 | 10/2004 | Sanderson |
| 6,885,313 B2 | 4/2005 | Selk, II et al. |
| 6,961,070 B1 | 11/2005 | Madison et al. |
| 6,997,097 B2 | 2/2006 | Harding |
| 7,047,861 B2 | 5/2006 | Solomon |
| 7,093,802 B2 | 8/2006 | Pitzer et al. |
| 7,121,183 B2 | 10/2006 | Waid et al. |
| 7,203,577 B2 * | 4/2007 | Gunn et al. ............... 701/3 |
| 7,210,392 B2 | 5/2007 | Greene et al. |
| 7,236,861 B2 | 6/2007 | Paradis et al. |
| 7,262,395 B2 | 8/2007 | Bilyk et al. |

OTHER PUBLICATIONS

Northrop Grumman, MH-60R/MH60S, All-Glass Cockpit Smart MFD, Navigations Systems, pp. 1 & 2.

\* cited by examiner

US 8,686,879 B2

GRAPHICAL DISPLAY FOR MUNITION RELEASE ENVELOPE

This application is a U.S. National Phase application of PCT Application No. PCT/US2008/077613 filed on Sep. 25, 2008.

BACKGROUND

The present application relates to aircraft instrumentation, and more particularly to graphical munitions release symbology.

Aircrew on attack runs must manage significant information over a short timescale. Munitions released from an aircraft must be released within a particular munition release envelope to maximize effective deployment. Textual data and inhibits are typically provided to determine whether the munitions may be released given the munition type, target location and current aircraft parameters. The data may in some cases be difficult for the aircrew to readily interpret during an attack run.

SUMMARY

A method for displaying a munition release envelope according to an exemplary aspect of the present application includes displaying a geometric munition release area with respect to an altitude scale and an airspeed scale and displaying a current aircraft state relative the geometric munition release area.

A module for displaying a munition release envelope according to an exemplary aspect of the present application includes a module for munition release in communication with a display system to display a geometric munition release area with respect to an altitude scale and an airspeed scale and to display a current aircraft state relative to the geometric munition release area.

A flight display for an aircraft according to an exemplary aspect of the present application includes a geometric munition release area with respect to an altitude scale and an airspeed scale and a current aircraft state indicator positioned relative to said geometric munition release area.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
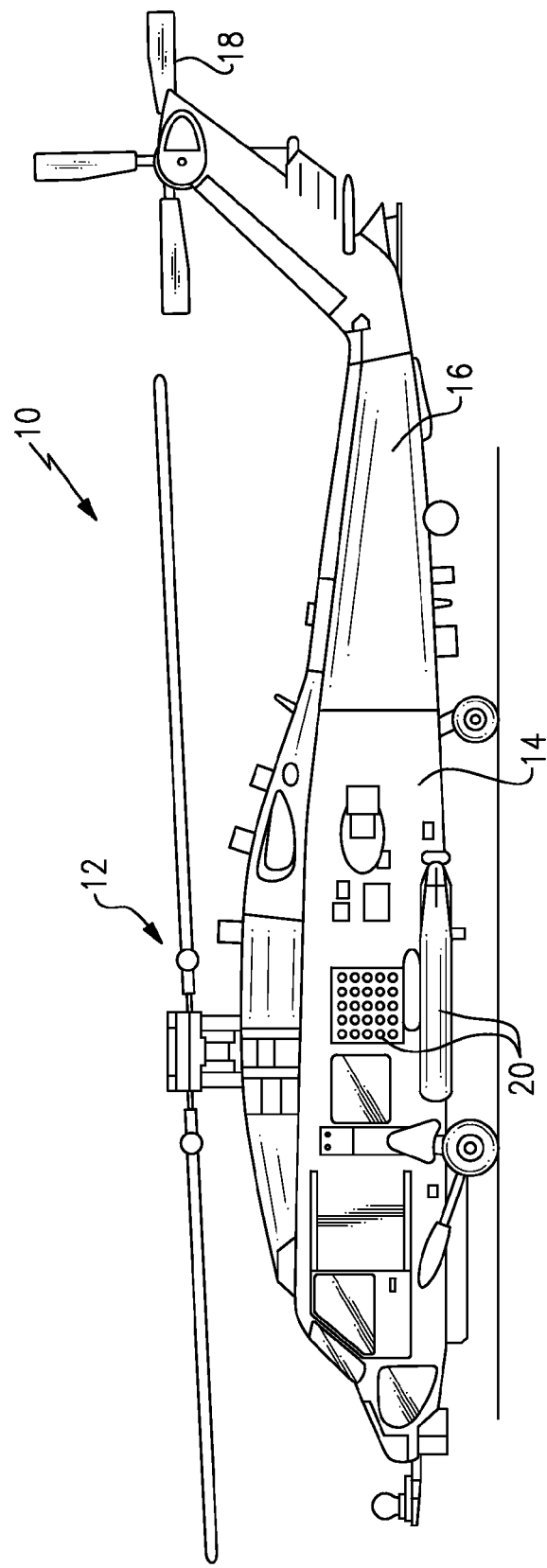
FIG. 1 is a schematic view of a rotary-wing aircraft embodiment for use with the present application.

FIG. 1 schematically illustrates a rotary-wing aircraft 10 having a main rotor system 12. The aircraft 10 includes an airframe 14 having an extending tail 16 which mounts an anti-torque system 18. Although a particular helicopter configuration is described in the disclosed embodiment, other configurations and/or machines, such as high speed compound rotary-wing aircraft with supplemental translational thrust systems, dual contra-rotating, coaxial rotor system aircraft, turbo-props, tilt-rotors, tilt-wing and straight wing aircraft, will also benefit herefrom.

The aircraft 10 may carry munitions 20 such as torpedoes, sonobuoys, depth charges, mines, missiles and other devices which must be released within a particular munition release envelope. The munition release envelope typically differs dependent upon munition type and aircraft flight condition.

Figure 2:
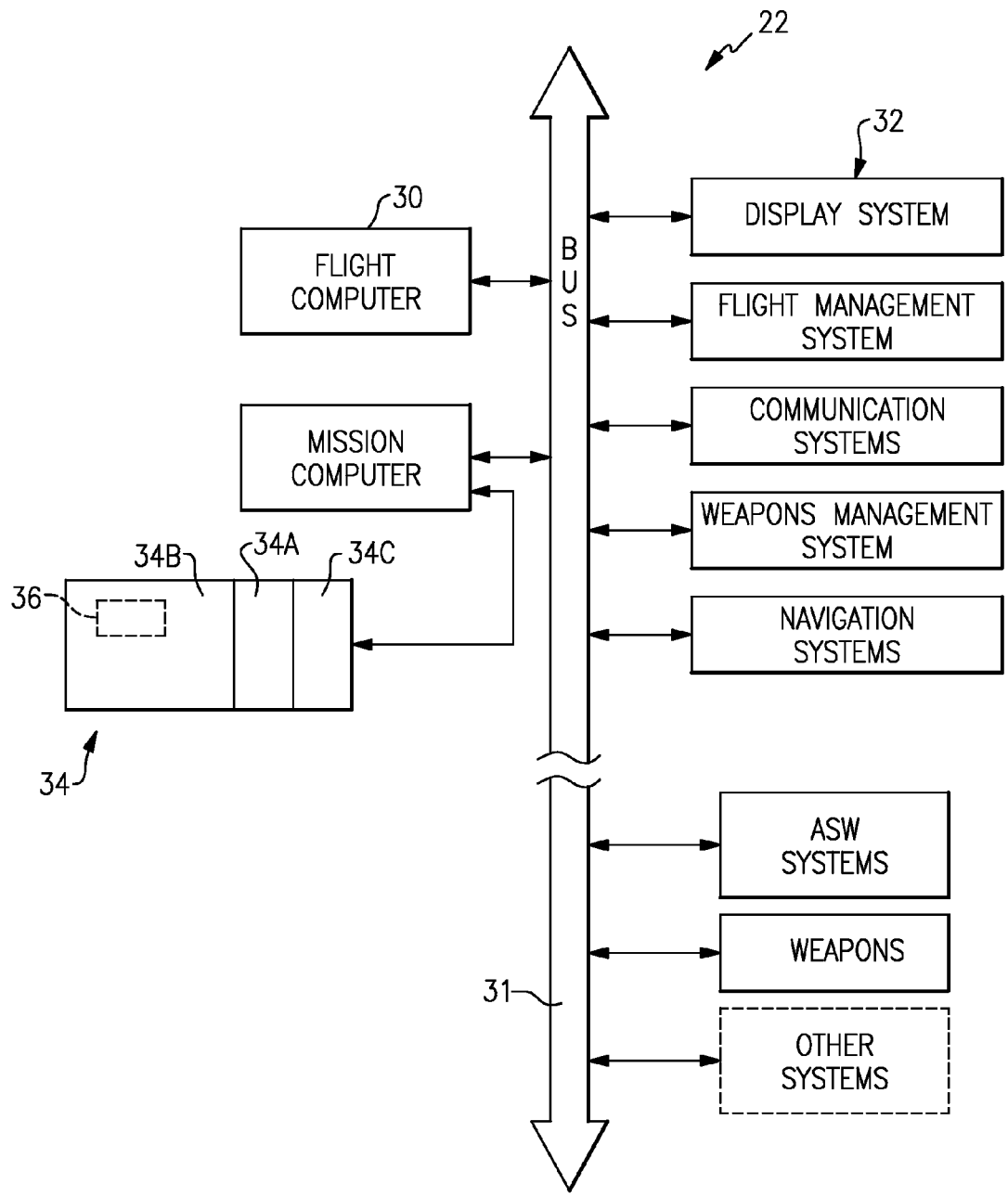
FIG. 2 is a block diagram of an exemplary aircraft avionics system which includes a module to implement a munition release envelope algorithm to determine a munition release envelope.

Referring to FIG. 2, an aircraft avionics system 22 may include a flight computer 30 in communication with a display system 32 through a data bus 31 integrated into an open architecture design. The display system 32 operates to control avionics and to display data therefrom as symbology to interface with an aircrew. Although the flight computer 30 is illustrated as an individual block, it should be understood that the flight computer 30 herein may include multiple computers having multiple channels and multiple redundant subsystems. Although the display system 32 is also illustrated as a single block, it should be understood that the display system 32 may include multiple subsystems such as data concentrator units, multifunction displays (MFDs), primary flight displays (PFDs) and other systems often as line replaceable units (LRUs). Although the present application may be used with a modern flight management system, it should be understood that the present application may be implemented in any number of different electronic systems without departing from the spirit and scope of this disclosure.

The flight computer 30 includes or communicates with a multiple of modules such as a module 34 for munition release. It should be understood by those skilled in the art with the benefit of this disclosure that although the module 34 is illustrated as in communication with a mission computer within the aircraft avionics system 22, the functions provided thereby may be enacted in dedicated hardware circuitry or programmed software routines capable of execution in any of the systems disclosed as blocks. The flight computer 30 communicates with other avionics systems and modules such as mission computers, FADECs, active inceptor systems and the display system 32. It should be understood that the term "module" as utilized herein may be dedicated or multi-functional hardware or software within the flight computer 30, a stand-alone module as illustrated in the disclosed non-limiting embodiment, or other system that utilizes data and control algorithms for operation of various systems and subsystems. The various systems and subsystems may include, for example, flight control systems, weapons systems, mission computers, air data computers, engine systems, sensor systems, collision and avoidance systems, as well as other types of systems currently installed or planned for future aircraft applications.

The module 34 for munition release may include a processor 34A, a memory 34B, and an interface 34C. The processor 34A may be a custom made or commercially available power PC type processor, a central processing unit, a processor among several processors associated with the flight computer 30, a semiconductor based microprocessor in the form of a microchip or chip set or generally any device for executing software instructions such as software stored in memory 34B to provide the desired performance characteristics. The memory 34B can include any one or combination of volatile memory elements, for example, random access memory such as RAM, DRAM, SRAM, SDRAM, VRAM, etc. and/or non-volatile memory elements, for example, ROM, hard drive, tape, CD-ROM, etc. Moreover, the memory may incorporate electronic, magnetic, optical, and/or other types of storage media. Note that the memory 34B can also have a distributed architecture, where various components are situated remotely from one another, but can be accessed by the processor 34A. The interface 34C communicates with the display system 32 and the flight computer 30 through the data bus 31 to control aircraft systems and display information received from other avionics systems.

The module 34 for munition release may obtain aircraft dynamic state, ambient conditions as well as other data from the flight computer 30 for display on the display system 32. The module 34 for munitions release stores data and control algorithms such as a munition release envelope algorithm 36 in the memory device 34B or other computer readable medium for operation of the processor 34A. The stored data and control algorithms are the scheme by which decisions are made to perform operations disclosed herein. The algorithm 36 may be defined by software in the memory 34B. When in operation, the processor 34A may be configured to execute the algorithm 36 stored within the memory 34B and to generally control operations pursuant to the software.

Figure 3:
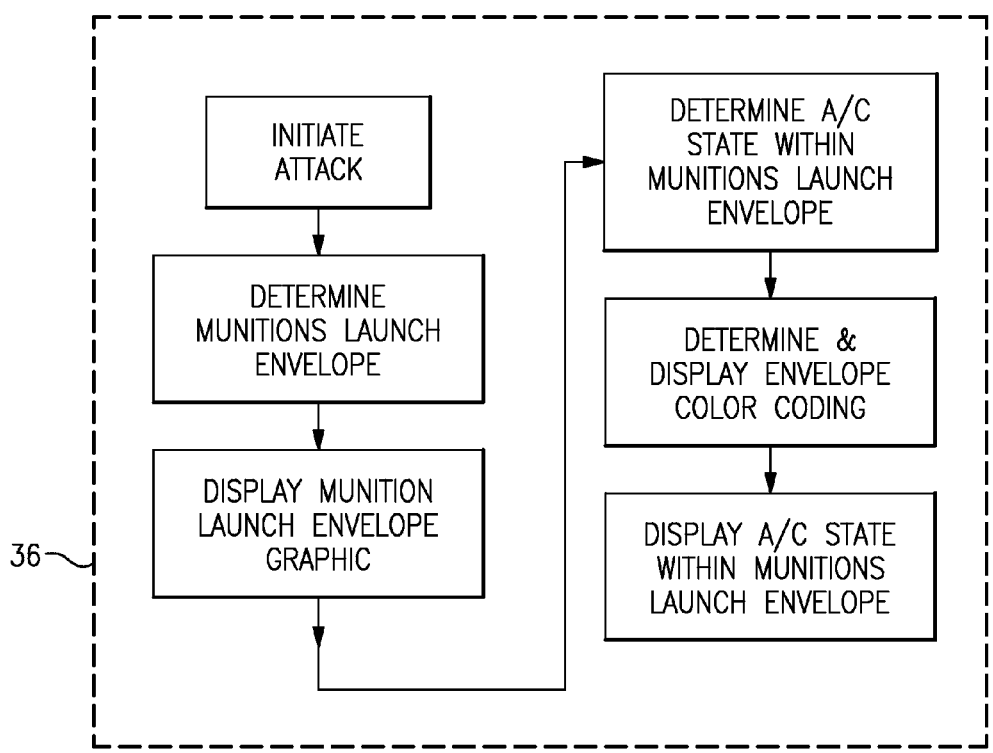
FIG. 3 is a flowchart illustrating operation of the munition release envelope algorithm.

The module 34 for munition release performs the munition release envelope algorithm 36. The functions of the algorithm 36 are schematically disclosed in terms of a functional block diagram format (FIG. 3). The munition release envelope algorithm 36 may include a multiple of particular release envelopes which may, for example, be related to munition type, aircraft type, aircraft flight condition and combinations thereof.

Figure 4:
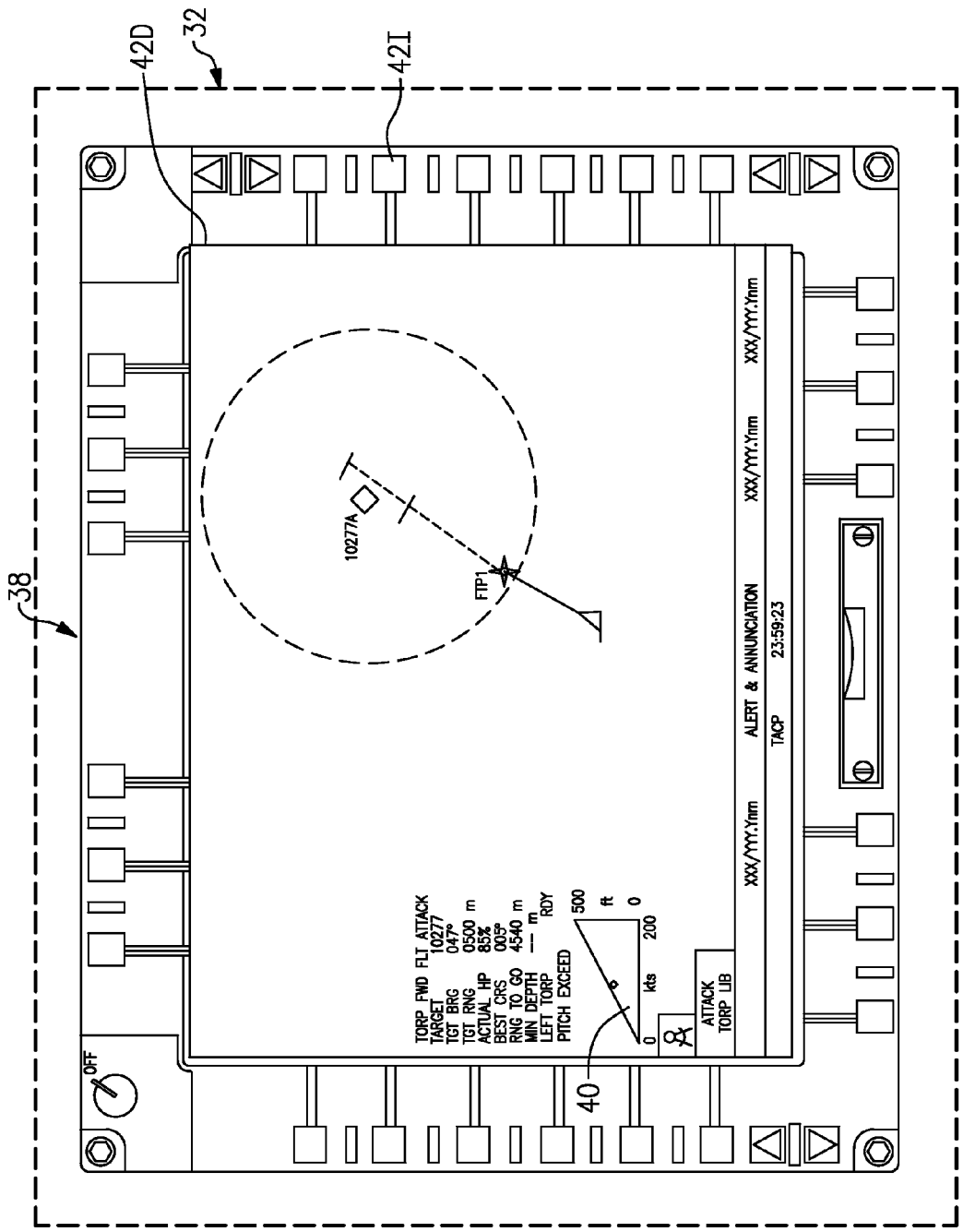
FIG. 4 is a screen display from an exemplary MFD which illustrates munition release symbology for munition release.

Referring to FIG. 4, the display system 32 as disclosed herein may include a MFD 38 to display various symbology indicative of flight instrumentation such as an attack envelope 40 to the aircrew. The MFD 38 generally includes a display 42D and an input device 42I to control avionics and to display data therefrom as symbology such as the munition release symbology 40 which interfaces with an aircrew. The display 42D may be based on technologies such as cathode-ray tubes, liquid-crystal displays, organic light-emitting diodes, or other technologies while the input device 42I may be, for example, a keyboard distributed adjacent the display 42 or a touch screen system.

Figure 5A:
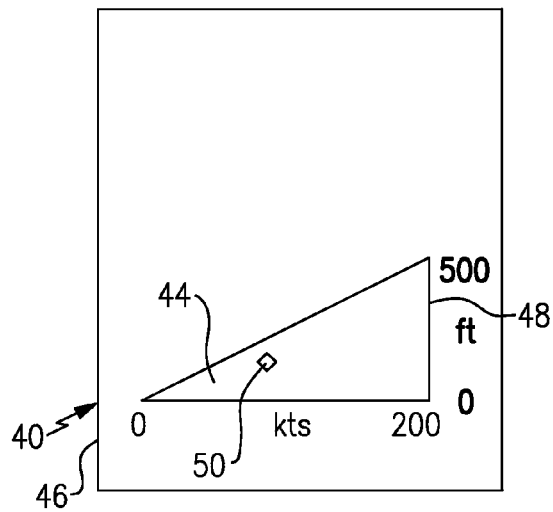
FIG. 5A is one non-limiting embodiment of a screen display of the munition release symbology in a forward flight mode in which the munition is within a munition release envelope such that immediate release is available.

Referring to FIG. 5A, the munition release symbology 40 provides graphical symbology that allows an aircrew to readily determine whether munition launch is inhibited as well as provide flight direction toward the munition release envelope if an inhibit presently exits. The munition release symbology 40 generally includes a geometric munition release area 44, an airspeed scale 46, an altitude scale 48 and an aircraft indicator 50 which locates the aircraft current flight condition relative the geometric munition release area 44.

Figure 6A:
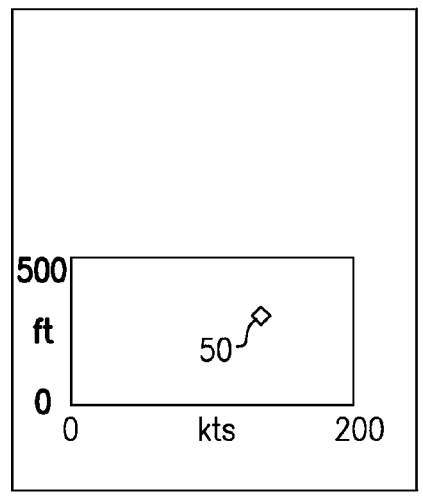
FIG. 6A is one non-limiting embodiment of a screen display of the munition release symbology in a hover flight mode in which the munition is within a munition release envelope such that immediate release is available.
Figure 5B:
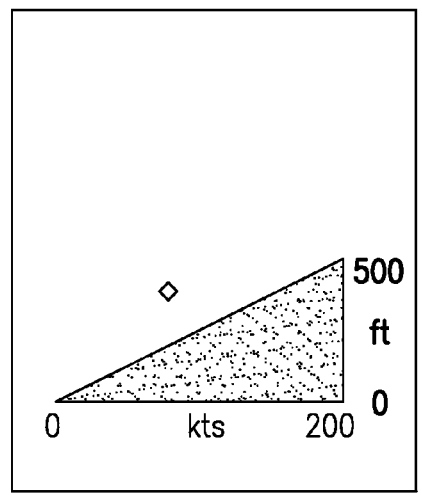
FIG. 5B is a screen display of the munition release symbology in the forward flight mode in which the munition is not within a munition release envelope.
Figure 6B:
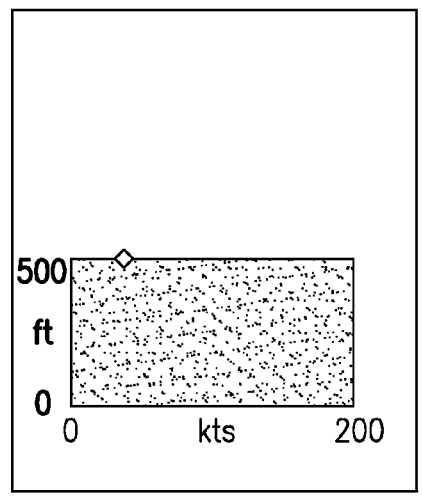
FIG. 6B is a screen display of the munition release symbology in the hover flight mode in which the munition is not within a munition release envelope.

The munition release symbology 40 is generally displayed in either a forward flight mode (FIGS. 5A-5B) or a hover flight mode (FIG. 6A-6B). When the aircrew selects a particular munition type, the algorithm 36 selects the proper mode in response to the aircraft flight state through communication with the flight computer 30 (FIG. 2). Each mode has limits which may be defined at least in terms of aircraft speed and altitude. It should be understood that the algorithm 36 may alternatively or additionally dynamically vary the shape of the geometric munition release area 44 in response to other modes and other environmental concerns such as barometric pressure, temperature, installation of proactive devices on the sonar head, as well as others.

In the forward flight mode (FIG. 5A), the geometric munition release area 44 is generally triangular in shape. It should be understood that the geometric munition release area 44 is defined by the type of munition selected and the aircraft type based on predetermined launch limits of the selected munition. The aircraft indicator 50 is positioned relative the geometric munition release area 44 to provide a graphic which displays whether munition release is available in a concise manner readily interpreted by the aircrew.

If the aircraft indicator 50 is positioned within the geometric munition release area 44, the munition is within the munition release envelope such that immediate release is available to the aircrew. The geometric munition release area 44 may also be color coded—for example green—to further communicate that immediate release is available to the aircrew.

Referring to FIG. 5B, if the aircraft indicator 50 is not positioned within the geometric munition release area 44, the munition is not within the munition release envelope and immediate release is not available to the aircrew. The geometric munition release area 44 may also be color coded—for example red—to further communicate that the aircrew must change the flight condition of the aircraft to overcome the munition release envelope flight condition inhibits. The relative position of the aircraft indicator 50 to the geometric munition release area 44 provides perspective to the aircrew as to what flight condition inhibits release. As illustrated in the disclosed non-limiting embodiment, the aircrew may reduce altitude or increase airspeed to enter the geometric munition release area 44.

The algorithm 36 also operates to display what corrective flight action is most efficient such as a change in altitude or a change in airspeed to correct the flight condition inhibits. In this non-limiting embodiment, it is more efficient to reduce altitude. The reduction in altitude may be indicated by relative color coding of the airspeed scale 46 and the altitude scale 48. The altitude scale 48 may be color coded to indicate out of limits—for example red—while the airspeed scale 46 may be color coded to indicate in limits—for example white—to thereby readily suggest the most efficient corrective flight actions to the aircrew. In one non-limiting embodiment, the munition release symbology 40 may be displayed in accords with the following table:

| Launch Inhibit Condition | Geometric munition release area | Airspeed Scale | Altitude Scale |
|---|---|---|---|
| Altitude & Speed within limits | Green | White | White |
| Altitude out of limits/Speed OK | Red | White | Red |
| Altitude OK/Speed out of limits | Red | Red | White |
| Altitude & Speed out of limits | Red | Red | Red |

It should be understood that other symbology such as arrows may alternatively or additionally be provided to further direct flight which corrects, inhibits, and indicate other conditions.

In the hover flight mode, the geometric munition release area 44 is generally rectilinear in shape but otherwise operates as described above to indicate that immediate release is available (FIG. 6A) or inhibited (FIG. 6B).

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed is:

1. A method for displaying a munition release envelope comprising:
    displaying a geometric munition release area with respect to an altitude scale and an airspeed scale;
    displaying a current aircraft state indicator relative to the geometric munition release area; and
    defining the geometric munition release area in response to a particular weapon system.

2. A method as recited in claim 1, further comprising;
    defining the geometric munition release area based on a particular aircraft flight mode.

3. A method as recited in claim 1, further comprising;
    defining the geometric munition release area in response to a forward flight mode.

4. A method as recited in claim 3, further comprising;
    defining the geometric munition release area as a triangular symbol.

5. A method as recited in claim 1, further comprising;
    defining the geometric munition release area in response to a hover mode.

6. A method as recited in claim 5, further comprising;
    defining the geometric munition release area as a rectilinear symbol.

7. A method as recited in claim 1, further comprising;
    displaying the current aircraft state indicator relative the geometric munition release area, wherein the geometric munition release area is color coded in response to a launch inhibit condition.

8. A method as recited in claim 7, further comprising;
    displaying the current aircraft state indicator as a diamond symbol.

9. A method as recited in claim 1, further comprising;
    displaying the current aircraft state indicator with respect to the altitude scale and the airspeed scale.

10. A method as recited in claim 1, further comprising;
    determining the current aircraft state position with respect to the altitude scale and the airspeed scale through communication with a flight control computer.

11. A method for displaying a munition release envelope comprising:
    displaying a geometric munition release area with respect to an altitude scale and an airspeed scale;
    displaying a current aircraft state indicator relative to the geometric munition release area; and
    color coding the geometric munition release area in response to a launch inhibit condition.

12. A method for displaying a munition release envelope comprising:
    displaying a geometric munition release area with respect to an altitude scale and an airspeed scale;
    displaying a current aircraft state indicator relative to the geometric munition release area; and
    color coding the altitude scale and an airspeed scale in response to a launch inhibit condition.

13. A system for displaying a munition release envelope, comprising:
    a display system; and
    a module for munition release in communication with said display system to display a geometric munition release area with respect to an altitude scale and an airspeed scale and to display a current aircraft state indicator relative to said geometric munition release area, wherein at least one of the geometric munition release area, the altitude scale, or the airspeed scale is color coded in response to a launch inhibit condition.

14. The system as recited in claim 13, wherein said module for munition release is in communication with a flight computer to determine said current aircraft state.

15. The system as recited in claim 13, wherein said module for munition release is a module of a flight computer.

16. A flight display for an aircraft, comprising:
    a geometric munition release area with respect to an altitude scale and an airspeed scale, the geometric munition release area defined in response to a particular weapon system; and
    a current aircraft state indicator positioned relative to said geometric munition release area.

17. The flight display as recited in claim 16, wherein said geometric munition release area is generally triangular.

18. The flight display as recited in claim 16, wherein said geometric munition release area is generally rectangular.

* * * * *